(12) United States Patent
Beppu et al.

(10) Patent No.: US 11,213,861 B2
(45) Date of Patent: Jan. 4, 2022

(54) CONVEYED ARTICLE SORTING DEVICE

(71) Applicant: Azbil Corporation, Tokyo (JP)

(72) Inventors: Hisashi Beppu, Tokyo (JP); Hidenobu Tochigi, Tokyo (JP); Xavier Gómez Garcia, Barcelona (ES)

(73) Assignee: AZBIL CORPORATION, Tokyo (JP)

( * ) Notice: Subject to any disclaimer, the term of this patent is extended or adjusted under 35 U.S.C. 154(b) by 0 days.

(21) Appl. No.: 17/048,182

(22) PCT Filed: Apr. 20, 2018

(86) PCT No.: PCT/JP2018/016268
§ 371 (c)(1),
(2) Date: Oct. 16, 2020

(87) PCT Pub. No.: WO2019/202726
PCT Pub. Date: Oct. 24, 2019

(65) Prior Publication Data
US 2021/0162466 A1 Jun. 3, 2021

(51) Int. Cl.
*B07C 5/36* (2006.01)
*B65G 47/82* (2006.01)
*B65G 47/88* (2006.01)

(52) U.S. Cl.
CPC ............ *B07C 5/362* (2013.01); *B65G 47/82* (2013.01); *B65G 47/8823* (2013.01); *B65G 2201/02* (2013.01); *B65G 2201/0235* (2013.01); *B65G 2203/0216* (2013.01); *B65G 2203/0233* (2013.01)

(58) Field of Classification Search
CPC .......... B65G 47/82; B65G 47/8823; B65G 2201/0235; B65G 2203/0216; B65G 2201/02; B65G 2203/0233; B07C 5/362

USPC ............ 198/370.07, 370.08, 457.07, 347.4
See application file for complete search history.

(56) References Cited

U.S. PATENT DOCUMENTS 3,133,638 A * 5/1964 Calhoun ............... B07C 5/3404
209/524
3,613,885 A * 10/1971 Rehse ................... B07C 5/3412
209/528

(Continued)

FOREIGN PATENT DOCUMENTS

CN 203998067 U 12/2014
CN 105445281 A 3/2016
(Continued)

OTHER PUBLICATIONS

International Search Report received for PCT Patent Application No. PCT/JP2018/016268, dated Jul. 17, 2018, 3 pages (1 page of English Translation of International Search Report and 2 pages of International Search Report).

(Continued)

*Primary Examiner* — James R Bidwell

(57) ABSTRACT

A conveyed article sorting device is provided, which has: a conveyor which conveys articles; a track configured such that the articles conveyed by the conveyor can be transferred onto the track from the conveyor; and a rotary gate which can come into contact with the articles on the conveyor; wherein, when an article to be sampled is conveyed by the conveyor, the rotary gate moves the article to be sampled from the conveyor onto the track.

7 Claims, 2 Drawing Sheets

(56) References Cited

U.S. PATENT DOCUMENTS

| | | | |
|---|---|---|---|
| 4,479,582 A * | 10/1984 | Ducloux | B07C 5/122 |
| | | | 209/552 |
| 5,392,928 A | 2/1995 | Nickey et al. | |
| 5,405,015 A | 4/1995 | Bhatia et al. | |
| 5,853,077 A * | 12/1998 | Schmitt | B65B 37/12 |
| | | | 198/383 |
| 9,120,629 B2 * | 9/2015 | Cavina | B65G 29/00 |
| 2014/0238820 A1 | 8/2014 | Cavina | |

FOREIGN PATENT DOCUMENTS

| | | |
|---|---|---|
| CN | 205673217 U | 11/2016 |
| JP | S50-160972 A | 12/1975 |
| JP | S60-61645 U | 4/1985 |
| JP | H08-230830 A | 9/1996 |
| JP | H11-314735 A | 11/1999 |
| JP | H11-337456 A | 12/1999 |
| JP | 2001-002234 A | 1/2001 |
| JP | 2003-098099 A | 4/2003 |
| JP | 2006-313070 A | 11/2006 |
| JP | 2007-064905 A | 3/2007 |
| JP | 2011-088737 A | 5/2011 |
| JP | 2014-527949 A | 10/2014 |
| JP | 2016-217764 A | 12/2016 |

OTHER PUBLICATIONS

China National Intellectual Property Administration, "First Office Action", issued in Chinese Patent Application No. 201880092466.5, which is a counterpart to U.S. Appl. No. 17/048,182, dated Jun. 30, 2021, 16 pages (8 pages of English translation of Office Action, and 8 pages of original Office Action).

* cited by examiner

CONVEYED ARTICLE SORTING DEVICE

CROSS-REFERENCE TO RELATED APPLICATIONS

This application is a National Stage entry under 35 U.S U.S.C. 371 of International Patent Application No. PCT/JP2018/016268, filed on Apr. 20, 2018, the entire contents of which are incorporated by reference herein.

TECHNICAL FIELD

The present invention relates to a conveyed article sorting device.

BACKGROUND ART

For example, when manufacturing pharmaceutical products or food products, such pharmaceutical products and food products may be freeze dried. Before a freeze dry process, the pharmaceutical products or the food products are put in containers such as vials. The containers, in which the pharmaceutical products or the food products are put, are halfway closed by caps, and are placed in a freeze dry oven. When the freeze dry process is completed, the containers are completely closed by caps in the freeze dry oven, and air in the containers is isolated from outside of the containers. Accordingly, cleanness in the containers is ensured. After the containers have been closed by caps, the containers are conveyed out of the freeze dry oven and are sent to the next process.

Typically, in the freeze dry oven, a number of containers are arranged in an arrayed pattern. Therefore, if temperature distribution and pressure distribution in the freeze dry oven are uneven, processing conditions for contents of the containers may fluctuate due to the arrangement in the freeze dry oven, so that the quality of the contents after the process may fluctuate. Therefore, there is a case where some containers containing a temperature sensor, a pressure sensor, or the like instead of the contents such as pharmaceutical products or food products are placed in the freeze dry oven together with the containers containing such contents to monitor a temperature or a pressure during the freeze dry process. The containers thus containing the sensors or the like other than the contents are made recognizable by, for example, differentiating in color of the caps from a normal color.

Before the freeze dry process, the containers are inspected in terms of presence or absence of the caps, positions of the halfway closed caps, an amount of the contents, and the like. For example, containers with no cap, containers with the halfway closed caps at inadequate positions, and containers having an inadequate amount of content are eliminated so as not to proceed to the freeze dry process. After the freeze dry, the containers are inspected in terms of the presence or absence of the caps, the positions of the closed caps, the colors of the caps, a state of a freeze-dried cake, and so on. For example, containers with no cap, containers with the closed caps at inadequate positions, containers indicating that a sensor is placed therein for monitoring by the color of the cap, containers containing the freeze-dried cakes in states which do not meet a standard are eliminated from a manufacture line so as not to proceed to a next process. Such sorting may be effected by human, and by a device (for example, see Patent Literatures 1 and 2). There is also a case where containers are sampled at random for snap inspection.

CITATION LIST

Patent Literature

PTL 1: CN105445281A
PTL 2: U.S. Pat. No. 5,392,928

SUMMARY OF INVENTION

Technical Problem

Aiming at shortening of time required for manufacturing products, and automation of a manufacturing process, as well as improvement of accuracy of sorting of the products based on a result of inspection, it is desired to automate a sorting process for products based on the result of inspection. However, in sorting devices of the related art, a complex and large-scale mechanism using a star-wheel, which is expensive, is employed. In addition, not only for a freeze dry process for pharmaceutical products or food products, a device capable of sorting each of a plurality of conveyed articles with a non-complex structure is required. Accordingly, it is an object of the present invention to provide a conveyed article sorting device capable of sorting each of a plurality of articles with a non-complex structure.

Solution to Problem

According to an aspect of the present invention, there is provided a conveyed articles sorting device including: a conveyor configured to convey articles; a track configured to allow the articles conveyed by the conveyor to be transferred from the conveyor; a rotary gate capable of coming into contact with the articles on the conveyor, in which, when an article to be sampled is conveyed by the conveyor, the rotary gate transfers the article to be sampled from the conveyor onto the track.

In the conveyed articles sorting device described above, the track may form a bypass route of the conveyor.

In the conveyed articles sorting device described above, the rotary gate may be able to transfer the article on the track onto the conveyor.

In the conveyed articles sorting device described above, a sensor configured to detect an article to be transferred to the conveyor from the track may further be provided.

The conveyed articles sorting device described above may further include a detection device configured to detect an article to be sampled.

In the conveyed articles sorting device described above, the rotary gate may select the article to be sampled at random.

In the conveyed articles sorting device described above, when an article to be eliminated is conveyed by the conveyor, the rotary gate may eliminate the article to be eliminated from the conveyor.

The conveyed articles sorting device described above may further include a detection device configured to detect an article to be eliminated.

In the conveyed articles sorting device described above, the articles are containers, and a container which does not contain a predetermined amount of drug, a container containing a freeze-dried cake which does not meet a predetermined standard, a container having a cap at a position other than a predetermined position, and a container having a cap in a predetermined color may be eliminated.

Advantageous Effects of Invention

According to the present invention, a conveyed article sorting device capable of sorting each of a plurality of articles with a non-complex structure may be provided.

DESCRIPTION OF EMBODIMENTS

Figure 1:
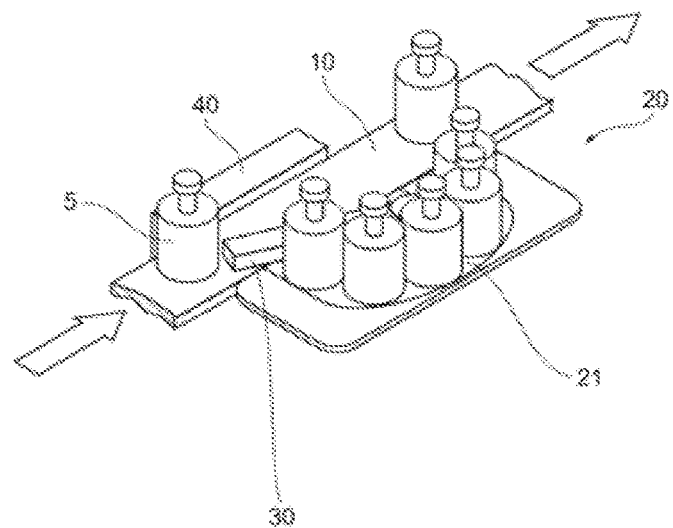
FIG. 1 is a schematic perspective view of a conveyed article sorting device according to an embodiment.

An embodiment of the present invention will be described below. In the drawings, the same or similar parts are designated by the same or similar reference signs. However, the drawings are schematic illustrations. Therefore, specific dimensions or the like are to be determined based on the following description. In addition, the drawings may include parts having different dimensional relationships and ratios from each other as a matter of course.

A conveyed article sorting device according to the embodiment includes, as illustrated in FIG. 1, a conveyor 10 configured to convey articles 5, a track 20 configured to allow the articles 5 conveyed by the conveyor 10 to be transferred from the conveyor 10, and a rotary gate 30 configured to be capable of coming into contact with the articles 5 on the conveyor 10. In the conveyed article sorting device of the embodiment, when articles 5 to be sampled are conveyed by the conveyor 10, the rotary gate 30 transfers the article 5 to be sampled from the conveyor 10 to the track 20.

The conveyed article sorting device of the embodiment is disposed, for example, in a clean room, but not limited thereto. Each of a plurality of the articles 5 is, but not specifically limited, a container, such as a vial, that stores pharmaceutical products to be subject to treatment such as freeze dry, or pharmaceutical products that have already subjected to the treatment such as freeze dry. Each of the plurality of articles 5 has, for example, a cylindrical shape. The conveyor 10 may move at, for example, a constant conveyance speed. The conveyor 10 may be driven, for example, by a servo motor. Movement of the conveyor 10 may be detected by an encoder and the servo motor may be closed-loop controlled to achieve a constant conveyance speed.

Figure 2A:
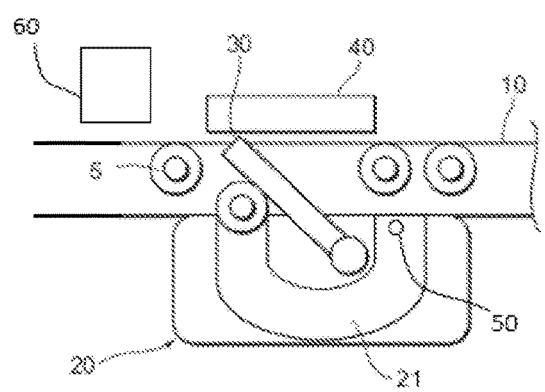
FIGS. 2A and 2B are schematic top views of the conveyed article sorting device according to the embodiment.
Figure 2B:
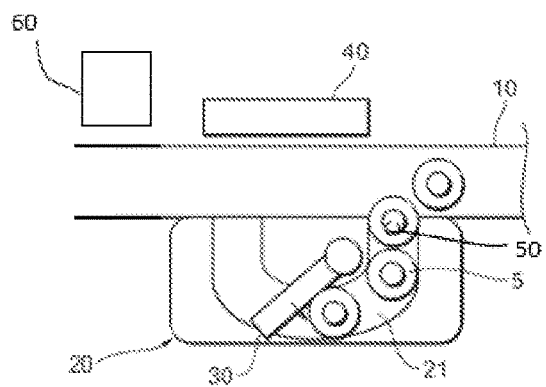

As illustrated in FIGS. 2A and 2B, the track 20 may be provided with a recess 21 configured to allow a row of articles 5 to pass. The width of the recess 21 is set to be equal to or greater than a diameter of the article 5 and is set not to allow two or more articles 5 to be accommodated in a width direction. The height of a bottom surface of the recess 21 is, for example, the same as the height of an upper surface of the conveyor 10. A leading end of the recess 21 faces the conveyor 10. A trailing end of the recess 21 also faces the conveyor 10. Therefore, the track 20 is configured to allow the articles 5 in the recess 21 in the track 20 to be transferred to the conveyor 10. The track 20 also functions as a bypass route of the conveyor 10.

The rotary gate 30 is, for example, a rod-shaped member. The rotary gate 30 is rotatable, for example, within a plane parallel to the upper surface of the conveyor 10. A center of rotation of the rotary gate 30 is, for example, positioned between the conveyor 10 and the recess 21 in the track 20. The length of the rotary gate 30 is set to be capable of coming into contact with the articles 5 on the conveyor 10. In addition, the length of the rotary gate 30 is set so that the recess 21 is included within the rotation radius of the rotary gate 30. The rotary gate 30 is driven by a drive unit such as a motor.

When the articles 5 to be sampled are conveyed by the conveyor 10, the rotary gate 30 is disposed at a position which prevents the article 5 from being conveyed in a direction parallel to a direction of travel of the conveyor 10, and guides the articles 5 to the leading end of the recess 21 in the track 20, as illustrated in FIG. 2A. Accordingly, the articles 5 are guided to the leading end of the recess 21 in the track 20 by a propelling force applied from the conveyor 10 and a repulsive force applied from the rotary gate 30. Note that, when the rotary gate 30 rotates on the conveyor 10, a conveyance speed of the conveyor 10 may be lowered to prevent the rotary gate from coming into contact with articles other than the articles 5 to be sampled.

The articles 5 to be sampled may be selected at random for snap inspection. Alternatively, articles 5 which have been determined to be sampled by an inspection device 60, which is disposed upstream of the conveyor 10, may be guided to the track 20. The articles 5 guided to the track 20 may be taken out manually by an operator.

As illustrated in FIG. 2B, when returning the articles 5 in the recess 21 on the track 20 onto the conveyor 10, the rotary gate 30 rotates in the recess 21 in the track 20 toward the trailing end of the recess 21 to push the articles 5 in the recess 21 toward the conveyor 10. Accordingly, the articles 5 in the recess 21 in the track 20 are transferred onto the conveyor 10. The articles 5 pushed out onto the conveyor 10 are conveyed by the conveyor 10. Alternatively, the operator may manually arrange new articles 5 to be pushed onto the conveyor 10 in the recess 21 in the track 20. The conveyed article sorting device according to the embodiment may include a sensor 50 configured to detect the presence of any articles 5 to be returned back onto the conveyor 10 at the trailing end of the recess 21 in the track 20. For example, the rotary gate 30 may rotate and push the articles 5 onto the conveyor 10 until the sensor 50 does not detect the articles 5 to be pushed back.

Figure 3A:
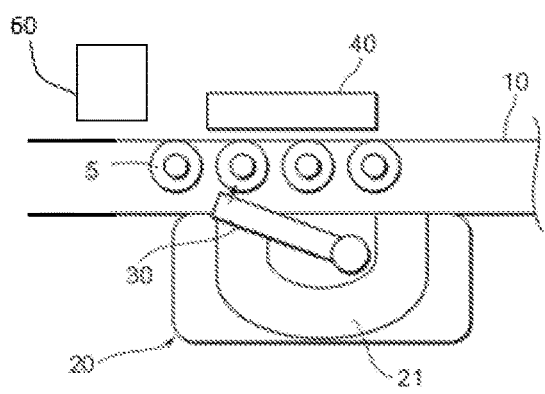
FIGS. 3A and 3B are schematic top views of the conveyed article sorting device according to the embodiment.
Figure 3B:
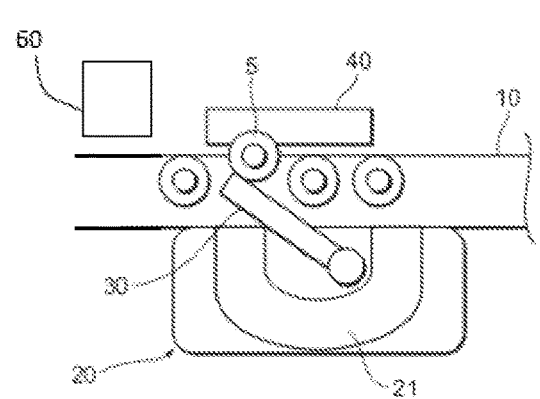

As illustrated in FIGS. 3A and 3B, a recycle bin 40 may be disposed on an opposite side of the conveyor 10 from the track 20. When the articles 5 that have been determined to be eliminated by the inspection device 60, which is disposed upstream of the conveyor 10, are conveyed by the conveyor 10, the rotary gate 30 pushes the articles 5 to be eliminated from the conveyor 10 into the recycle bin 40 to eliminate the articles 5 to be eliminated from the conveyor 10. The rotary gate 30 may rotate at a high speed toward the articles 5 to be eliminated so as to apply a strong force to the articles 5 to be eliminated. When the center of rotation of the rotary gate 30 resides on a track 20 side, the conveyance speed of the conveyor 10 does not have to be lowered when eliminating the articles 5 to be eliminated.

When the articles 5 are vials containing a pharmaceutical product before being freeze dried, the inspection device 60 inspects the presence or absence of the caps of the vials, the positions of the halfway closed caps of the vials, and the amount of liquid-state pharmaceutical product in the vials, and the like. The inspection device 60 may determine vials that do not meet a predetermined standard, such as vials having no cap, vials having halfway closed caps not at predetermined positions, vials not containing a predetermined amount of liquid-state pharmaceutical product, to be eliminated by the rotary gate 30 located downstream.

When the articles 5 are vials containing a freeze dried pharmaceutical product, the inspection device 60 inspects the presence or absence of the caps of the vials, the positions of the caps that have closed the vials, the color of the caps, the states of the freeze-dried cakes in the vials, and so on. The inspection device 60 may determine vials that do not meet a predetermined standard, such as the vials having no cap, the vials having closed caps not at predetermined positions, the vials closed by caps having a predetermined color which indicates that the content is not a pharmaceutical product but a sensor, the vials containing the freeze-dried cakes that do not meet a predetermined standard, to be eliminated at the rotary gate 30 located downstream.

For example, when the conveyance speed of the conveyor 10 is closed-loop controlled, a time required for the articles 5 inspected by the inspection device 60, which is disposed upstream, to reach the conveyed article sorting device according to the embodiment may be accurately estimated. According to the conveyed article sorting device of the embodiment described thus far, each of the plurality of articles 5 may be sorted with a non-complex structure.

Other Embodiments

Although the present invention has been described based on the embodiments, description and drawings which constitute part of this disclosure should not be interpreted to limit the present invention. From this disclosure, various alternative embodiments, examples, and operational technologies will become apparent for those skilled in the art. For example, the articles are not limited to vials containing the pharmaceutical products but may be containers containing food products or beverages. Alternatively, the articles may be precise parts or the like. Further, it is a matter of course that the articles are not limited to articles to be subject to the freeze dry process. In this manner, it should be understood that the present invention includes various embodiments which are not described in this specification.

REFERENCE SIGNS LIST

5 . . . article, 10 . . . conveyor, 20 . . . track, 21 . . . recess, 30 . . . rotary gate, 40 . . . recycle bin, 50 . . . sensor, 60 . . . inspection device

The invention claimed is:

1. A conveyed article sorting device comprising:
a conveyor configured to convey articles;
a track configured to allow the articles conveyed by the conveyor to be transferred from the conveyor; and
a rotary gate rotatable to come into contact with the articles on the conveyor;
wherein
when an article to be sampled is conveyed by the conveyor, the rotary gate transfers the article to be sampled from the conveyor to the track,
the track forms a bypass route of the conveyor,
the rotary gate is rotatable to transfer the article on the track to the conveyor, and
when an article not to be sampled is conveyed by the conveyor, the rotary gate does not transfer the article not to be sampled from the conveyor to the track.

2. The conveyed article sorting device according to claim 1, further comprising a sensor configured to detect an article to be transferred from the track to the conveyor.

3. The conveyed article sorting device according to claim 1, further comprising an inspection device configured to determine the article to be sampled.

4. The conveyed article sorting device according to claim 1, wherein the rotary gate selects the article to be sampled at random.

5. A conveyed article sorting device comprising:
a conveyor configured to convey articles;
a track configured to allow the articles conveyed by the conveyor to be transferred from the conveyor; and
a rotary gate rotatable to come into contact with the articles on the conveyor;
wherein
when an article to be sampled is conveyed by the conveyor, the rotary gate transfers the article to be sampled from the conveyor to the track,
when an article not to be sampled is conveyed by the conveyor, the rotary gate does not transfer the article not to be sampled from the conveyor to the track, and
when an article to be eliminated is conveyed by the conveyor, the rotary gate eliminates the article to be eliminated from the conveyor by pushing the article to be eliminated to a side of the conveyor opposite from the track.

6. The conveyed article sorting device according to claim 5, further comprising an inspection device configured to determine the article to be eliminated.

7. The conveyed article sorting device according to claim 5, wherein the articles are containers, and a container which does not contain a predetermined amount of drug, a container containing a freeze-dried cake which does not meet a predetermined standard, a container having a cap at a position other than a predetermined position, and a container having a cap in a predetermined color are eliminated.

* * * * *